United States Patent
Markarian et al.

[15] 3,654,523
[45] Apr. 4, 1972

[54] WET ELECTROLYTIC CAPACITORS

[72] Inventors: Mark Markarian; Francis J. Gamari, both of Williamstown, Mass.

[73] Assignee: Sprague Electric Company, North Adams, Mass.

[22] Filed: July 17, 1970

[21] Appl. No.: 55,867

[52] U.S. Cl. ............................................. 317/230, 252/62.2
[51] Int. Cl. ............................................................ H01g 9/04
[58] Field of Search ........................ 317/230, 233; 252/62.2

[56] References Cited

UNITED STATES PATENTS

| | | |
|---|---|---|
| 2,932,153 | 4/1960 | Bernard et al. ........................ 317/230 |
| 2,965,816 | 12/1960 | Ross ........................................ 317/230 |
| 3,403,304 | 9/1968 | Ross et al. ............................. 317/230 |
| 3,403,305 | 9/1968 | Santway et al. ...................... 317/230 |
| 3,487,270 | 12/1969 | Alwitt .................................... 317/230 |

*Primary Examiner*—James D. Kallam
*Attorney*—Connolly and Hutz and Vincent H. Sweeney

[57] ABSTRACT

A tantalum anode foil having a dielectric film formed thereon and an aluminum cathode foil with an aluminum oxide film thereon are in capacitive relationship with an electrolyte having an extended temperature range of compatibility with aluminum from between −55° to 125° C.

8 Claims, 3 Drawing Figures

Patented April 4, 1972  3,654,523

WET ELECTROLYTIC CAPACITORS

BACKGROUND OF THE INVENTION

The present invention relates to a foil-type wet electrolytic capacitor, and more particularly to a wound foil wet electrolytic capacitor employing a tantalum anode foil and an aluminum cathode foil and having an extended temperature range of operation normally consistent with foil capacitors having both electrodes of tantalum.

Electrolytic capacitors commonly employ metal electrodes on which a thin dielectric oxide coating of the electrode metal has been formed. When compared with various film-forming metals heretofore employed as electrodes in capacitors, tantalum affords numerous advantages. One of the more important advantages of electrolytic capacitors having tantalum foils is that they may be operated over an extended temperature range of about −55° to 125° C. with a minimum change in capacitance and resistance over that range. The reason that tantalum electrolytic capacitors can be operated over an extended temperature range is the extreme compatibility of tantalum and tantalum oxide with the most active electrolytes even at temperatures above 85° C. Most prior art tantalum electrolytes attack aluminum and aluminum oxide upon heating at or from 85° C. Tantalum however, is expensive and substantially contributes to the cost of electrolytic capacitors; consequently the industry has been in search of means for reducing the costs of tantalum capacitors or alternatively of developing a capacitor using materials less expensive than tantalum, yet having equivalent or improved performance characteristics to tantalum.

Therefore it is an object of this invention to produce an improved tantalum capacitor at a materially reduced cost.

It is a further object of this invention to provide an electrolytic capacitor which is operable over a temperature range of about −55° to 125° C. with a reduced change in capacitance and resistance over that range. It is a particular object of this invention to provide an electrolytic capacitor having a tantalum foil anode and an aluminum foil cathode that would exceed the specification requirements of all-tantalum capacitors.

SUMMARY OF THE INVENTION

A wet electrolytic capacitor formed in accordance with this invention generally involves a convolutely wound capacitor section which comprises a tantalum anode foil having a dielectric film formed thereon, an aluminum cathode foil having an aluminum oxide film thereon and an absorbent dielectric spacer between the anode and cathode foils. The electrolyte impregnating the dielectric spacer has an extended temperature range of compatibility with the aluminum cathode foil from between −55° to 125° C.

More particularly the electrolyte comprises complexes formed by the interaction of boric acid and dialkylamines with either o-dihydroxybenzenes or naphthalenes. The capacitor section is contained in a tubular metal can which may either be open at one end or both. The open ends of the can are sealed with insulative elastomer plugs that are impervious to the electrolyte. Terminal wires welded to the respective anode and cathode foils pass through the elastomer plugs to provide outside electrical contact to the respective foils. In the single seal construction, contact is provided from the aluminum cathode foil to the can by means of a folded metal tab. The compatibility of the electrolyte with aluminum over the extended temperature range permits the substitution of aluminum cathode foils for tantalum cathode foils in tantalum electrolytic capacitors without degrading the high performance characteristics normally associated with tantalum capacitors.

DESCRIPTION OF THE PREFERRED EMBODIMENT

Figure 1:
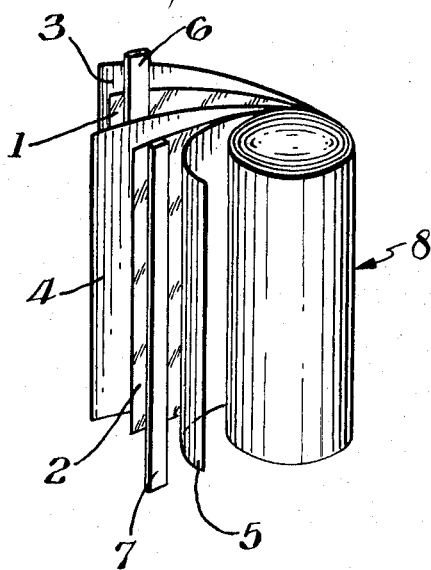
FIG. 1 shows an electrolytic capacitor assembly of rolled type in which the invention may be embodied.

Referring to the drawing and in particular to FIG. 1, there is shown a partially unrolled capacitor section of conventional construction comprising a pair of electrode foils 1 and 2 separated by spacers 3, 4 and 5.

Figure 2:
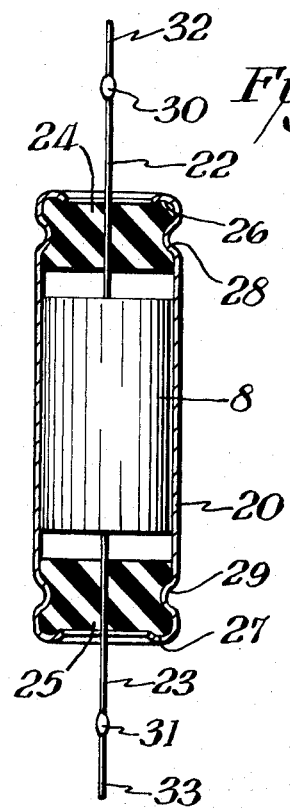
FIG. 2 shows the capacitor of FIG. 1 arranged in a casing.
Figure 3:
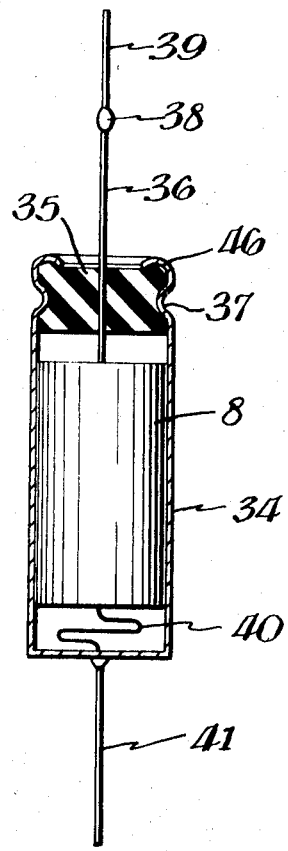
FIG. 3 shows another type of casing in which the capacitor of FIG. 1 may be enclosed.

In accordance with the present invention the anode foil 1 is made of tantalum and the cathode foil 2 is made of aluminum having a purity level of from 99.45 to 99.99 percent purity. The tantalum anode foil 1 may be advantageously etched and has a dielectric oxide film thereon. The dielectric oxide film may be produced by film-forming processes such as anodizing which are well known in the electrolytic capacitor art. It may be desirable to form the aluminum cathode foil to a low voltage, preferably 4v., to provide the capacitor with some reverse voltage capability, although this is not a requirement as long as an aluminum oxide film is present. The aluminum cathode foil may also be etched to increase the surface area. Between foils 1 and 2 are sheets of absorbent dielectric spacer material 3, 4 and 5 composed conventionally of cellulosic material such as kraft paper, or other suitable material of a permeable porous impregnatable nature. Terminals 6 and 7 are secured to the respective foils 1 and 2 and extend in opposite directions. The electrode foils and dielectric sheets are convolutely wound and inserted into a casing as shown in FIGS. 2 and 3.

The electrolyte used must be one which is compatible with both tantalum and aluminum, and particularly aluminum in the extended temperature range up to 125° C. The porous spacers 3, 4 and 5 are fully impregnated with the electrolyte compositions of this invention. Extended temperature electrolytes which do not attack anodic aluminum oxide at elevated temperatures have recently been developed. The preferred electrolytes consist of complexes formed by the interaction of o-dihydroxybenzenes or naphthalenes with boric acid and dialkylamines of which the following are examples.

One example of an electrolyte particularly suited for use with the tantalum anode and aluminum cathode configuration is an in situ formation of di-isopropylammonium borodi 2,3-naphthalenediolate. This particular electrolyte consists of a mixture of 1 gram of di-isopropylamine, 0.6 gram of boric acid and 3.2 grams of 2,3-naphthalenediol dissolved in 100 grams of dimethylformamide and is found to be suitable for use in capacitors having voltage ratings from 0 to 50v.

Another extended temperature electrolyte is a compound of tributylammonium borodisalicylate which is formed by mixing 0.01 mole of tributylamine, 0.01 mole of boric acid and 0.02 mole of salicylic acid dissolved in 1.37 moles of dimethylformamide. This electrolyte is also satisfactory for use in capacitors having voltage ratings from 0 to 5v.

A third electrolyte also found to be highly compatible for use with the tantalum anode aluminum cathode combination was prepared from 83.97 parts by weight dimethylformamide, 7.9 parts by weight 2-methyl-2,4-pentanediol, 0.83 parts by weight of 2,3-naphthalenediol and 8.3 parts by weight of boric acid. This electrolyte can be used in capacitors having ratings above 50 v.

These particular electrolytes are only illustrative and by no means intended to be inclusive of all the extended temperature electrolytes that are suitable for use with the described capacitor.

The electrode foils and dielectric sheets are wound into a compact rolled section 8 prior to insertion into a casing as shown in FIG. 2 and FIG. 3. FIG. 2 shows the capacitor assembly 8 enclosed in a metal casing 20 with terminals 22 and 23 extending respectively through sealing plugs 24 and 25 made of an insulating material such as Teflon (polytetrafluoroethylene) or alternatively of other types of suitable elastomeric material. Sealing plugs 24, 25 are retained within can 20 by spinning over the upper and lower rims of the can onto the plugs to form lips 26, 27, respectively, which retain the plugs. The side wall of the can 20 is sealed by suitable means such as rolling to indent crimps 28 and 29 into the sides of sealing plugs 24 and 25, respectively. The can 20 is preferably made of aluminum and terminals 22 and 23 are preferably of tantalum, and are welded to tantalum anode foil 1 and aluminum cathode foil 2 by techniques well known to the art such as thermocompression welding. Solderable or weldable leads 32 and 33 are butt welded to the terminals 22 and 23 at weld joints 30 and 31, respectively.

FIG. 3 shows an alternate construction of the single-seal type. Capacitor section 8 of FIG. 1 is inserted into open ended tubular can 34. Terminal 36 extends through sealing plug 35 which also is preferably made of an insulating material such as teflon or alternatively may be made of other types of suitable elastomeric material. Sealing plug 35 is retained within can 34 by spinning over the upper rim of the can onto the plug to form lip 46 which retains the plug. The side wall of the can is also shaped by suitable means such as rolling to indent crimp 37 into the side of sealing plug 35. Terminal 36 is preferably made of tantalum welded to the tantalum foil anode 1 at one end thereof by such well known means as thermocompression welding with the other end butt welded at 38 to a solderable or weldable lead 39. The aluminum cathode foil 2 is connected to the can 34 by means of folding tab 40. Folding tab 40 is preferably made of aluminum, one end of which is welded to aluminum cathode foil 2 and the other end is welded to can 34 which also is preferably made of aluminum. Tab 40 is welded to the bottom of can 34 before insertion of capacitor section 8 into the can. Terminal 41 is preferably tinned copper and welded to the bottom surface of can 34.

Capacitors formed in accordance with this invention exhibit some unexpected and surprising results when tested over a life cycle of 2,000 hours. The overall cost advantage in being able to substitute an aluminum cathode foil for a tantalum cathode foil would be immediately obvious to anyone familiar with the present state of the art for wet electrolytic capacitors. However it would be expected that any cost advantage would be offset by a degradation in capacitor performance, especially in the stability of the capacitance over an extended period of time at elevated temperatures. However, capacitors formed in accordance with this invention, and tested at various temperatures over a period of 2,000 hours displayed improved capacitance stability over that of all-tantalum capacitors, especially in the lower voltage ranges. The following data illustrate the percentage change in capacitance for capacitors having aluminum foil cathodes and impregnated with extended temperature electrolytes, over a period of 2,000 hours at 125° C. versus the percentage change in capacitance for standard all-tantalum electrolytic capacitors of equal value and tested over the same length of time and at the same temperature.

|  | Percent change in capacitance after 2000 hours at 125°C. for wet electrolytic capacitor having aluminum cathode foil and extended temperature electrolyte | Percent change in capacitance after 2,000 hours at 125°C. for standard tantalum wet electrolytic capacitor |
| --- | --- | --- |
| 15 V. | 1.8% | 9.6% |
| 25 V. | 0.9% | 5.9% |
| 50 V. | 3.4% | 4.1% |
| 100 V. | 0.8% | 1.4% |

As can be seen from the data, the tantalum capacitors of this invention having aluminum foil cathodes and extended temperature electrolytes exhibit less change in capacitance over a protracted time than do standard all-tantalum wet electrolytic capacitors. While we do not intend to be bound by any particular theory of operation, this surprising result is attributed to the fact that the cathodic aluminum oxide dissolves slightly in the electrolyte at the elevated temperature, thereby causing a slight increase in capacitance which compensates for the slight decrease in capacitance caused by the loss of electrolyte. Standard tantalum wet electrolytic capacitors, while still suffering from the effects of loss of electrolyte, are not able to compensate for the decrease in capacitance because of the inherent stability of the cathodic tantalum oxide. Also it is not necessary that the aluminum cathode foil be especially formed to a predetermined voltage in order for the compensating mechanism to be effective. Aluminum has a natural oxide coating of approximately 1.5 v. and this is sufficient without deliberately forming an additional oxide coating by anodizing. The self compensating effect is only of practical value where the capacitor contains a tantalum anode foil, an aluminum cathode foil, and an extended temperature range electrolyte. If standard prior art tantalum electrolytes were used, the dissolution of the cathodic aluminum oxide would be so excessive at 125° C. as to destroy the cathode foil, thereby rendering the capacitor inoperative.

What is claimed is:

1. A wet electrolytic capacitor comprising a tantalum anode foil having a dielectric film formed thereon, an aluminum cathode foil having a slight aluminum oxide film thereon and in capacitive relation to said anode foil; an electrolyte contacting said anode and said cathode and having an extended temperature range of compatibility with said aluminum cathode foil from between −55° to 125° C., said anode foil and said cathode foil and said electrolyte being housed within an aluminum container.

2. The capacitor of claim 1 wherein said electrolyte comprises complexes formed by the interaction of boric acid and dialkylamines with one of the group consisting of o-dihydroxybenzenes and -naphthalenes.

3. The capacitor of claim 2 wherein said electrolyte is a compound of di-isopropylammonium borodi 2,3-naphthalenediolate.

4. The capacitor of claim 2 wherein said electrolyte is a compound of tributylammonium borodisalicylate.

5. The capacitor of claim 2 wherein said electrolyte is a mixture of dimethylformamide, 2-methyl-2,4-pentanediol, naphthalenediol and boric acid.

6. The capacitor of claim 1 wherein said anode foil and said cathode foil are convolutely wound together with dielectric spacers into a compact roll and housed within said container having at least one open end sealed with an insulative elastomer plug which is impervious to said electrolyte, and contacting means including at least one terminal wire connected to one of said foils and passing through said sealing plug.

7. The capacitor of claim 6 wherein said aluminum container is open at the anode end which is sealed with an insulative elastomer plug, with contact from said aluminum cathode foil to said container achieved by an aluminum tab welded to said cathode foil and said container.

8. The capacitor of claim 6 wherein said container is open at both ends; and said contacting means include a tantalum terminal wire connected to each of said tantalum anode foil and said aluminum cathode foil and passed through an insulative plug sealing each of said ends.

* * * * *